United States Patent [19]

Widl et al.

[11] 3,729,590

[45] Apr. 24, 1973

[54] APPARATUS FOR TRANSMITTING A DATA FLOW BY MEANS OF A PCM-FLOW

[75] Inventors: Walter Herbert Erwin Widl, Bandhagen; Orjan Mats Mattsson, Taby, both of Sweden

[73] Assignee: Telefonaktiebolaget LM Ericsson, Stockholm, Sweden

[22] Filed: Jan. 20, 1972

[21] Appl. No.: 219,243

[30] Foreign Application Priority Data

Feb. 5, 1971 Sweden ....................................1459

[52] U.S. Cl. ................................................179/15 AP

[51] Int. Cl. ..................................................H04j 3/04

[58] Field of Search .......................179/15 AP, 15 BY

*Primary Examiner*—Ralph D. Blakeslee

*Attorney*—Hane, Baxley & Spiecens

[57] ABSTRACT

A method and an apparatus, respectively, for transmitting a data flow by means of a PCM-flow from a transmitter terminal to a receiver terminal, the bits of the data flow being timed to the bits of the PCM-flow during a selected time slot and the bit rate of the data flow that is regenerated at the receiver terminal being precisely equal to the bit rate of the data flow at the transmitter terminal. This is accomplished according to the principle of the invention by dividing the data flow at the transmitter terminal into short and long groups of bits which alternate with each other and which are mutually identified by means of at least one identification bit joined to each one of the bit groups, and by having at least two control information bits that indicate whether synchronism, lagging or leading respectively exists for the data flow in relation to the PCM-flow, joined to the short bit groups so as to drive at the receiver terminal a bit timing pulse generator into synchronism with the data flow at the transmitter terminal.

2 Claims, 6 Drawing Figures

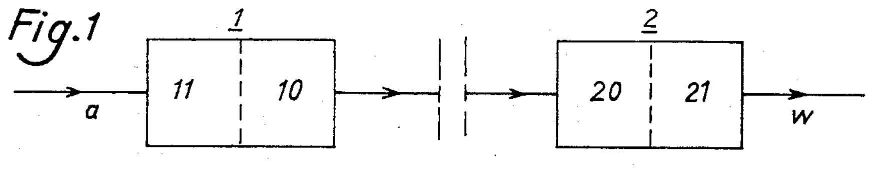
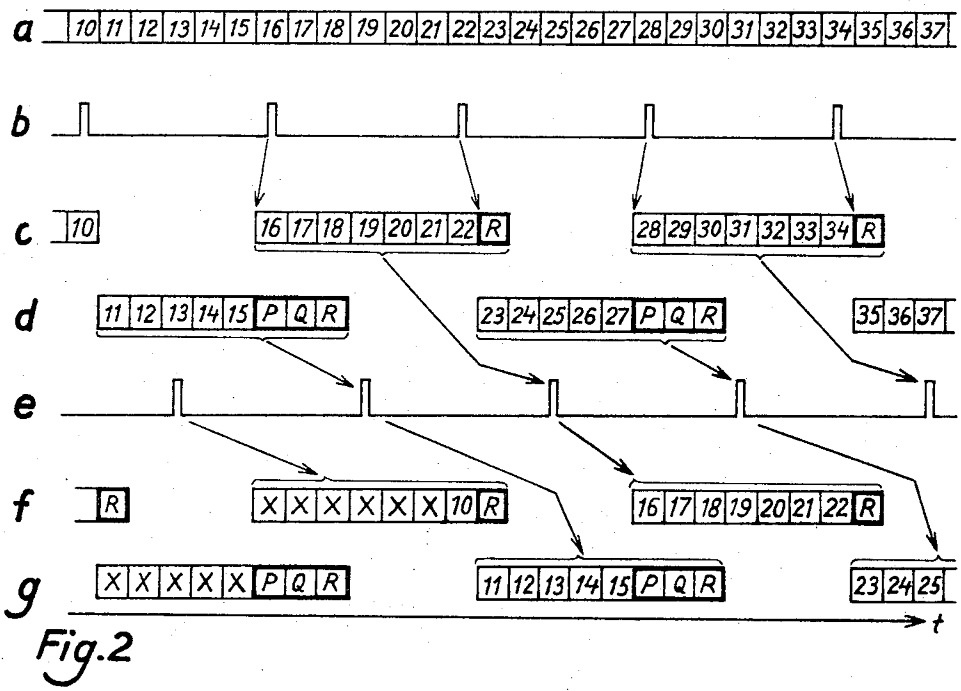
Fig.2
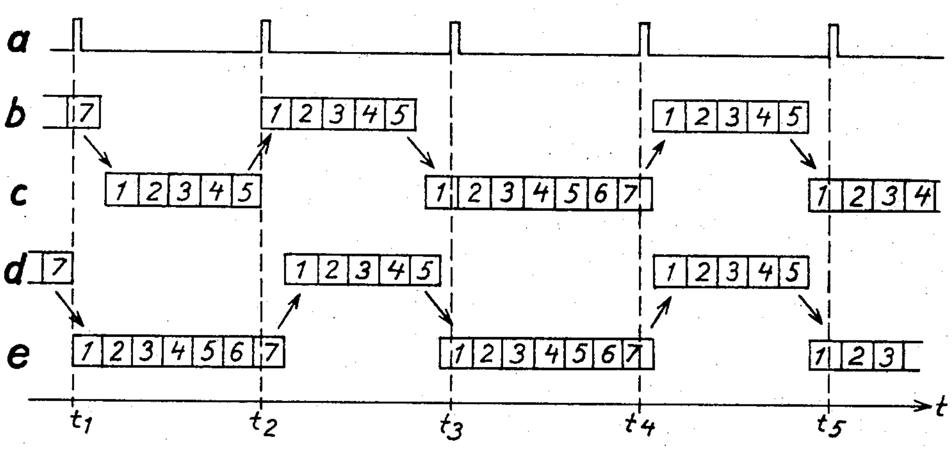
Fig.3

Patented April 24, 1973 3,729,590

4 Sheets-Sheet 2

Patented April 24, 1973 3,729,590

4 Sheets-Sheet 4

| V22 | V23 | $\tau_1$ | $\tau_2$ | $\tau_3$ | $\sum_{i=1}^{3} \tau_i$ | $\frac{1}{3}\sum_{i=1}^{3} \tau_i$ |
|---|---|---|---|---|---|---|
| 0 | 0 | 43 | 43 | 42 | 128 | $42\frac{2}{3}$ |
| 0 | 1 | 43 | 43 | 43 | 129 | 43 |
| 1 | 0 | 43 | 42 | 42 | 127 | $42\frac{1}{3}$ |

APPARATUS FOR TRANSMITTING A DATA FLOW BY MEANS OF A PCM-FLOW

This invention refers to a method and an apparatus respectively for transmitting a data flow by means of a PCM-flow, the bits of the data flow being transmitted from a transmitter terminal to a receiver terminal and being timed to the bits of the PCM-flow during a selected time slot.

In said type of transmission it is desirable that the bit rate of the regenerated data flow at the receiver terminal equals exactly the bit rate of the data flow at the transmitter terminal. This can be achieved in such a way that the PCM-flow besides data bits also with frequent intervals transmits control information bits controlling the generation of the bit timing pulses at the receiver terminal. Known methods have however been unable to combine frequent intervals for transmitting the control information with an efficient use of the capacity of the selected time slot for transmitting the data information. A closer description of the known methods are found for example in CCITT,COM, Sp.A. -No. 72-E and COM Sp.A. -No. 60-E.

The characteristics of the invention according to the method and the apparatus respectively appear from the accompanying claims.

The invention will be explained more in detail below with reference to the enclosed drawing in which FIG. 1 shows a block diagram of the principal structure of a PCM-apparatus for transmitting a data flow by means of a PCM-flow according to the invention.

FIGS. 2 and 3 show time diagrams for explaining the principle as to how the data flow is encoded and decoded according to the invention.

Figure 4:
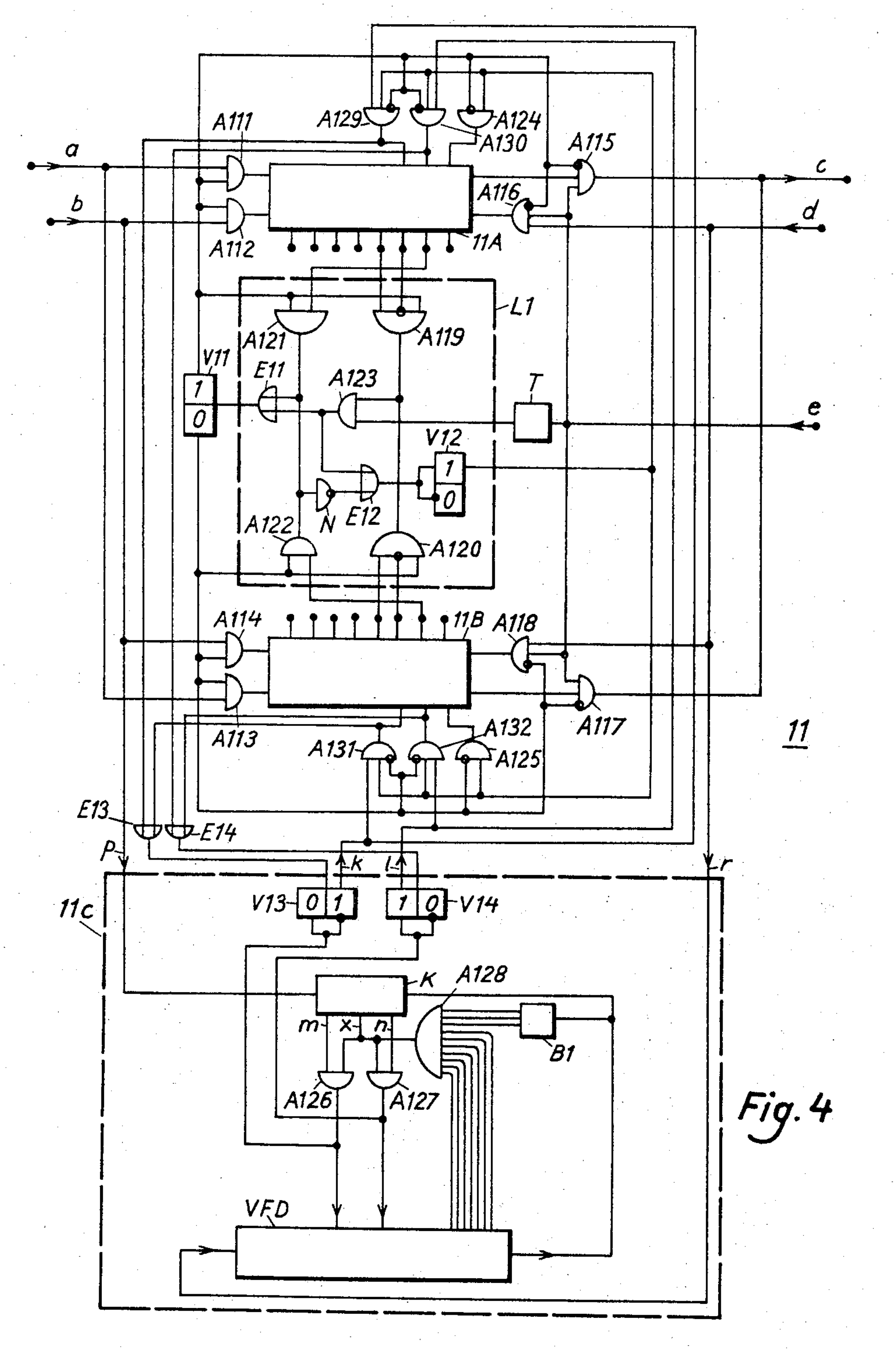
FIG. 4 is a logic diagram of an encoding apparatus at the transmitter terminal of the PCM-apparatus.

FIG. 1 shows the fundamental structure of the PCM-apparatus according to the invention. A transmitter terminal 1 comprises besides a PCM-transmitter 10 of the conventional type an encoder 11 which receives a data flow on an input *a* and stores the data flow in such a way that the PCM-transmitter 10 can read out and within a selected time slot can forward the data flow in the form of PCM-signals to a PCM-receiver 20 at a receiving terminal 2. Via a decoder 21, in which the PCM-signals are registered and stored, the PCM-signals are again converted into a data flow delivered on an output *w*.

According to the principle of the invention it is assumed that the relation between the bit frequency of the data flow received on the input *a* of the encoder 11 and the frequency of the time slot selected for the data transmission, or a submultiple frequency of the same, nominally constitutes an integer. In the present example it is assumed that exactly six data bits are nominally contained between two consecutive time slots for the data transmission. According to an example the data flow then is transmitted in groups of either five or seven bits which each are included in an individual PCM-word comprising eight PCM-bits all of which are assumed to be available for the transmission. The rule, according to which said groups of five and seven data bits are formed, is now defined thereby that a group of five data bits is formed if within a time slot interval the time has not been sufficient to register six data bits in the encoder 11 while if the time has been sufficient to register six data bits, also the seventh data bit is awaited in order to form a group of seven data bits.

With normally six data bits per time slot interval this condition occurs alternately and said groups are consequently formed alternately. If fewer data pulses than assumed arrive per time slot interval, it occurs however sooner or later that within two consecutive time slot intervals the time is not sufficient to register six data pulses in the encoder 11. The result will be, according to the above-mentioned rule, that a five-group is followed by a further five-group, in consequence of which the number of transmitted data pulses is reduced to the required number. If, on the contrary, more data pulses than assumed come in per time slot interval it occurs sooner or later that the time is sufficient to register said six data pulses within two consecutive time slot intervals. The result will then be that according to the above-mentioned rule a seven-group is followed by a further seven-group in consequence of which the number of transmitted data pulses is increased to the required number.

Thus it appears that by repeating in sequence a short and a long bit group respectively the number of transmitted data bits is decreased and increased respectively in order to keep in such a way at the receiver terminal the number of data bits obtained per time unit equal to the number of data bits fed in per time unit to the transmitter terminal.

In the time diagram in FIG. 2 line *a* shows a data flow which is fed to the input *a* of the encoder 11 in the transmitter terminal 1. Line *b* shows pulses the period time of which corresponds to the earlier mentioned time slot interval. Lines *c* and *d* in FIG. 2 show groups of five and seven data bits respectively which groups have been formed by the data flow on line *a* and are included in their respective PCM-words comprising eight bit elements, a last bit R of which contains information whether the data bits are five or seven to the number. In those PCM-words which contain only five data bits further bits P and Q are at disposal. These bits P and Q are used to transmit control information bits to the receiver terminal 2 and to indicate whether the bit frequency in the data flow has a lagging in relation to the PCM-bit frequency, is in synchronism with it or has a leading in relation to the same. The bits P and Q are used at the receiver terminal 2 in order to bring a local bit timing generator into synchronism with the data flow at the transmitter terminal 1.

The PCM-words are transmitted during a particular time slot selected for the data transmission, the periodicity of which is indicated on line *e*. Here it ought to be observed that the pulses shown on line *b* are phase shifted by half a time slot interval in relation to the time slots on line *e*. This depends on the fact that the pulses on line *b* are used to decide if a group is to obtain five or seven data bits which decision however must be made in good time before the time slot during which the data bits shall be sent out, is initiated. As an example, the data bits 11–15 have come in when a pulse occurs on line *b* . According to the previously mentioned rule then a group of five data bits is formed. The group is completed by P, Q and R-bits and all eight bits are transmitted during the following time slot as a PCM-word from the transmitter terminal 1 to the receiver terminal 2, where the PCM-word is stored. Reading out of the transmitted and stored PCM-word starts approximately half a time slot interval after the receiving as it is indicated on lines *f* and *g* in FIG. 2.

FIG. 3 describes the procedure when the normal pattern with alternately five-and seven-groups is changed, dependent on the fact that the data flow is either slower or swifter than what has been assumed. On line *a* in FIG. 3 the same pulses are shown as on line *b* in FIG. 2. It is assumed that during a certain time slot interval a group of seven data bits has been formed as it is indicated at the moment *t*1 on line *b* . During the next time slot interval a group of five data bits is formed as it is indicated on line *c* . It is now assumed that the data flow is slower than what has been assumed and that within this time slot interval the time has just been sufficient to register the fifth data bit before the time slot interval is terminated, a group containing five data bits being formed. Due to the lagging in the data flow in relation to the assumed rate the time is now not sufficient during the next time slot interval to register the sixth bit and for this reason a group comprising five data information bits will be formed once again. The fundamental rule says, as we recall that either have five bits been registered and not the sixth bit within one time slot interval, a group of five data bits being formed, or has the sixth bit been registered and then also the seventh bit is awaited to become registered in order to form a group of seven data bits. The procedure is hereafter again the normal one until it occurs again that during one time slot interval the time is sufficient to register exactly five data bits and in the following time slot interval consequently the time is not sufficient to register the sixth data bit.

In the contrary case when consequently the data flow is swifter than what has been assumed there will occur within a certain time slot interval that the time is just sufficient to register seven data bits before the interval is terminated. During the next time slot interval the time is then sufficient to register six data bits before the interval is terminated which implies that according to the fundamental rule a further group comprising seven data bits will become formed. This is indicated on line *d* and *e* in FIG. 3. The forming of groups now continues normally with alternately five-and seven-groups until after a number of time slot intervals it occurs again that the seventh bit is registered just at the end of an interval. During the next interval then the time is sufficient to register six whole bits before the interval is terminated, in consequence of which a further group of seven data bits will be formed.

FIG. 4 shows a logic diagram of the encoder 11 which is connected to the PCM-transmitter 10 in the transmitter terminal 1. The encoder 11 has two inputs *a* and *b* for the receiving of an incoming data flow and data bit timing pulses respectively. The data flow is registered in groups of definite numbers of bit elements alternately in two buffer registers 11A and 11B, the alternation in the registering being achieved by means of AND-gates A111–A114 controlled from a flip-flop V11 which in its turn is controlled from a logic circuit L1. The encoder 11 has further more an output *c* on which the contents in the respective buffer register 11A and 11B can be read out in the form of PCM-bits in the PCM-word during the time slot of the PCM-transmitter 10, selected for the data transmission. The encoder 11 is for this purpose provided with two inputs connected to the PCM-transmitter 10, an input *d* to which PCM-bit timing pulses are fed and an input *e* to which pulses are fed being simultaneously with and having the same length of time as said time slot. The read out occurs alternately from the buffer registers 11A and 11B which is achieved by means of AND-gates A115–A118 controlled from the previously mentioned flip-flop V11.

According to the example exactly six data bits out of the data flow shall nominally be contained within the time interval between two consecutive time slots intended for the data transmission. In the encoder 11 the registering in the buffer registers 11A and 11B is in this respect controlled in order to produce that a sequence of groups of five and seven data bits which alternate with each other is registered. This is achieved by bringing said time slot pulses from the input *e* via a time delay stage T, the purpose of which will be explained later, to the logic circuit L1 where they generate a control signal to the flip-flop V11 to switch the registering between the buffer registers 11A and 11B upon the appearance of a time slot pulse if five but not six data bits have been registered in the buffer register connected at the moment. If, on the contrary, the time has not been sufficient to register six data bits when the time slot pulse appears, the logic circuit L1 will not supply the control signal to the flip-flop V11 until also the seventh data bit is registered.

The logic circuit L1 contains the AND-gates A119–A122 in order to sense how many data bits are registered in the buffer register connected at the moment for registering, the AND-gates A119–A120 giving an output signal if five but not six data bits are registered in the respective buffer register and the AND-gates A121–122 giving an output signal when seven data bits are registered. The outputs from the AND-gates A119–120 are connected to one and the same input of an AND-gate A123 to another input of which the delay stage T is connected. The AND-gate A123 gives consequently an output signal upon the appearance of a time slot pulse from the delay stage T only if simultaneously either the AND-gate A119 or the AND-gate A120 gives an output signal in which case the output signal of the AND-gate A123 is forwarded via an OR-gate E11 as a control signal to the flip-flop V11, the registering being switched between the buffer registers 11A and 11B. If, on the contrary, no control signal from the AND-gate A123 is obtained, the registering continues in the buffer register connected at the moment, until the AND-gate A121 or the AND-gate A122 gives an output signal which output signal via the OR-gate E11 is forwarded as a control signal to the flip-flop V11, so that the registering is switched to the other buffer register.

With regard to the fact that the registering of a group of five or seven data bits must be terminated wit a certain margin before the read out of the same group is initiated on the output *c* by a pulse on the input *e* it is necessary that the pulses incoming to the input *e* obtain a certain time delay before they are brought to the logic circuit L1. Since said margin however may not exceed the duration of the registering of the shorter group of five data bits, in order to prevent that the pulse from the input *e* initiates read out in a register while the registering is still going on in the same register, said time delay is according to the same example selected to constitute three data bits, which corresponds to one-half period of the time slot pulses. The purpose of the delay stage T is to achieve precisely this time delay of one-half period in the time slot pulses.

Dependent on the fact that the bit timing frequency of the data flow and the bit timing frequency of the PCM-flow are assumed not to be constitutionally synchronous to each other, at times irregularities of the kind mentioned in connection with FIG. 3 must be produced by the logic circuit L1 in the normal registering sequence of the buffer registers 11A and 11B consisting of alternate groups of five and seven data bits, in order to achieve that the PCM-words generated on the output *c* of the encoder 11 will transmit a number of data bits equal to the number of data bits fed to the input *a* . Due to said irregularities it is however necessary that the groups of five or seven data bits included in the PCM-flow can be identified mutually upon the regeneration of the original data flow. This is achieved in such a way that when the AND-gate A123 has given a pulse to the flip-flop V11, and thus a group of five data bits has been formed, the same pulse is via an OR-gate E12 registered in a flip-flop register V12 which after the flip-flop V11 has been switched, registers via an OR-gate A124 or A125 a binary "one" in the eighth cell in the buffer register connected for read out. Thus in the PCM-word of eight bit positions a binary one in the last bit position will indicate that the bit positions 1–5 contain data bits. When a group of seven data bits has been formed owing to the fact that either of the AND-gates A121 and A122 gives an output signal the output signal is brought, besides to the OR-gate E11, also via an inverting circuit N to the OR-gate E12 and from there to the flip-flop register V12 which by this is set to zero. After the flip-flop V11 has been switched, the flip-flop register V12 now registers via the AND-gate A124 or A125 a binary zero in the eighth cell in the buffer register being previously connected. Thus a binary zero in the last bit position in the PCM-word will indicate that the bit positions 1–7 contain data bits.

Upon the regeneration of the original data flow from the transmitted PCM-flow it is now assumed to be a requirement that the bit rate of the data flow is regenerated with a high degree of precision. This requirement can be fulfilled thereby that the transmitted PCM-flow besides data bits also with frequent intervals contains control information bits for regenerating said bit rate, the exactness of the regeneration being inversely proportional to the time distance between two consecutive transmissions of the control information. Thanks to the principle of the encoder 11 to register and to read out respectively the data bits in groups of five or seven, it is according to the invention possible to reduce said time distance to only two time slot intervals, namely by joining to each group of five data bits two control information bits. In this way an efficient use of the capacity of the PCM-time slot for the transmission of the data flow will according to the invention be combined with a very high degree of precision in the regeneration of the bit rate of the data flow.

The said control information bits are obtained from two outputs *k* and *l* of a comparator circuit 11C included in the encoder 11, the principle of construction of which is known per se. The comparator circuit 11C contains a phase comparator K which compares a selected submultiple frequency of the bit frequency of the data flow with a variable submultiple frequency of the bit frequency of the PCM-flow. The one input of the phase comparator K is connected to the input *b* of the encoder 11 and its second input is connected to the output of a variable frequency divider VFD which is fed from the input *d* of the encoder 11 . The phase comparator K has two outputs *m* and *n* for indicating whether synchronism, lagging or leading exists for the data flow in relation to the PCM-flow. Synchronism is then represented by a binary zero on each of the outputs *m* and *n* while lagging and leading are represented by a binary one on the output n and on the output *m* respectively.

When the phase comparator K indicates synchronism the variable frequency divider VFD generates a definite submultiple frequency of the bit frequency of the PCM-flow which definite submultiple frequency upon nominal bit frequency in the PCM-flow is equal to the selected submultiple frequency of the nominal bit frequency of the data flow. If, on the contrary, the phase comparator K indicates lagging or leading the variable frequency divider VFD is to generate during a predetermined counting period, a lower and a higher respectively submultiple frequency of the bit frequency in the PCM-flow. In order to achieve this the frequency division of the variable frequency divider VFD is controlled periodically from the outputs *m* and *n* of the phase comparator K by opening two AND-gates A126 and A127 by means of an AND-gate A128 upon a definite position in the variable frequency divider VFD and in a binary counter B1 connected in cascade with the same. Upon this the control information of the phase comparator K is registered in two flip-flop registers V13 and V14, the registered control information being obtainable via the earlier mentioned outputs *k* and *l* , and the comparator K is then set to zero by providing a reset input *x* with a signal from the AND-gate A128.

The control information bits from the outputs *k* and *l* of the comparator circuit 11C can via a pair of AND-gates A129–A130 be registered in the sixth and the seventh cell of the buffer register 11A, or via another pair of AND-gates A131-A132 be registered in the likewise sixth and seventh cells of the buffer register 11B. The condition that is to be fulfilled for opening one of said pairs of AND-gates for registering in its associated buffer register is that the buffer register is connected for read out and that the AND-gate A123 previously has set the flip-flop V12 to one which implies that a group of five data bits has been formed in the buffer register. Upon the registering in either of the buffer registers the flip-flops V13 and V14 are set to zero by means of reset inputs which via OR-gates E13 and E14 are connected to their respective cells in the buffer registers 11A and 11B.

Figure 5:
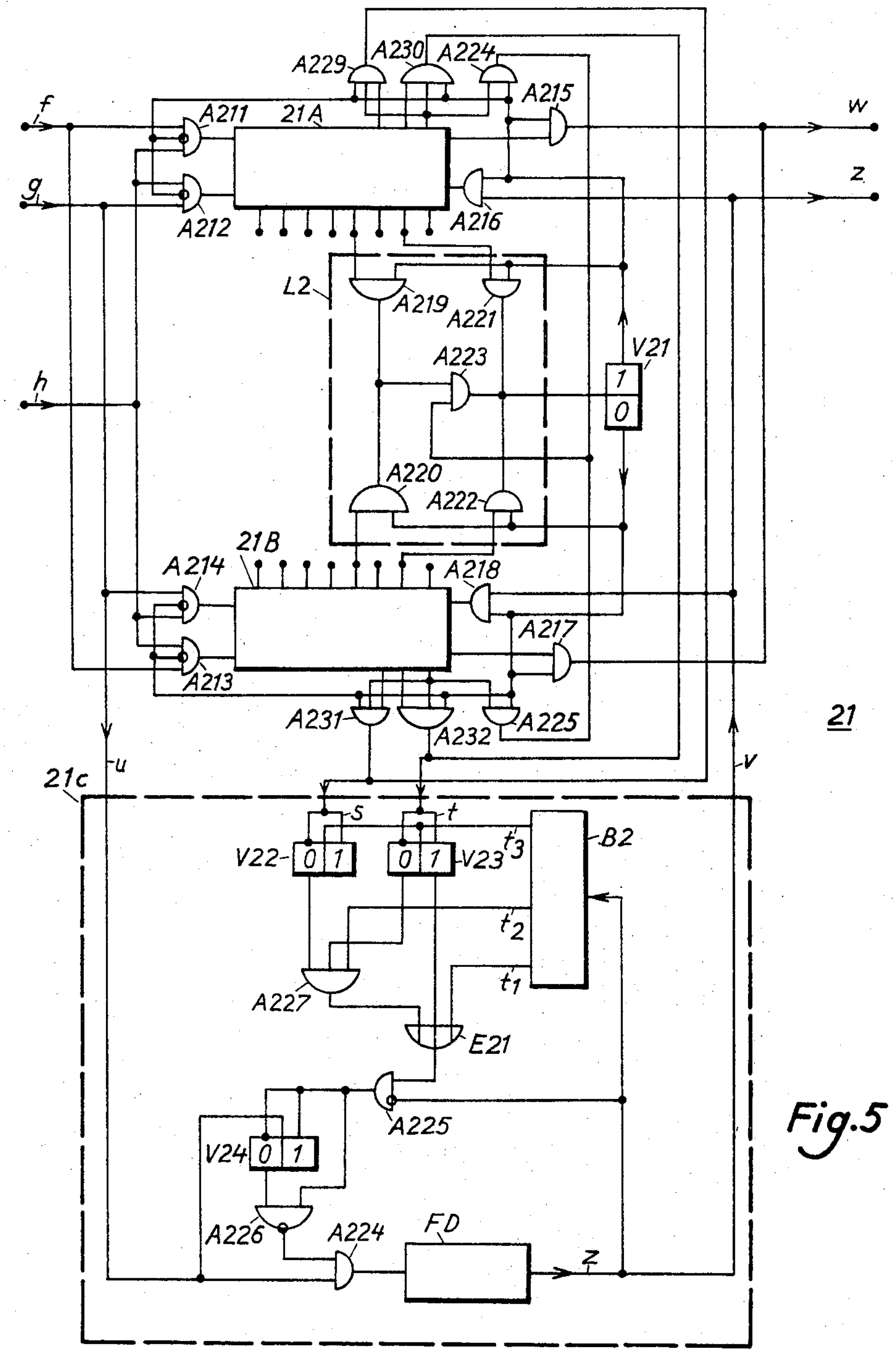
FIG. 5 is a logic diagram of a decoding apparatus at the receiver terminal of the PCM-apparatus and FIG. 6 contains a table and a time diagram showing an example of how bit timing pulses to the data flow can be regenerated in the decoding apparatus.

FIG. 5 shows a principal diagram of the decoder 21 connected to the PCM-receiver 20 at the receiver terminal 2. The decoder 21 has three inputs *f*, *g* and *h* respectively for receiving the transmitted PCM-flow, bit timing pulses corresponding to the PCM-bit frequency, and pulses appearing simultaneously with and having the same duration as the time slot selected for the data transmission. The PCM-words within the consecutive time slots are registered alternately in two buffer registers 21A and 21B, the switching of the registering being achieved by means of AND-gates A211–214 controlled from a bistable circuit V21 which in its turn is controlled from a logic circuit L2. The decoder 21 has furthermore two outputs *w* and *z* for delivering a data flow corresponding to the data flow at the transmitter terminal and bit timing pulses for the delivered data flow respectively. The read out occurs alternately from the buffer registers 21A and 21B, which is achieved by means of AND-gates A215–218 controlled from the bistable circuit V21.

As it has been mentioned earlier those PCM-words which transmit five data bits also contain two control information bits for the regeneration of the bit rate in the data flow. These control information bits are read out from the buffer registers 21A and 21B via two pairs of AND-gates A229–230 and A231–232 respectively and are identified thereby that the eighth bit position of the PCM-word contains a binary one which activates said AND-gates A229–232. The control information bits are fed to their respective inputs *s* and *t* in a generator circuit 21C, comprising two flip-flop registers V22 and V23 in which the respective control information bits are registered. The generator circuit 21C the construction of which will be explained more in detail below obtains on an input *u* bit timing pulses corresponding to the PCM-bit frequency and delivers on an output *v* bit timing pulses corresponding to the data bit frequency at the transmitter terminal.

The logic circuit L2 contains four AND-gates A219–222 in order to sense how many data bits that are read out from the buffer register connected at the moment for read out, the AND-gates A219–220 giving an output signal when five data bits are read out from the respective buffer register and the AND-gates A221–222 giving an output signal when seven data bits are read out. The outputs from the AND-gates A219–220 are connected to an input of an AND-gate A223 to another input of which the eighth cell in the respective buffer register is connected via an AND-gate A224 and A225 respectively. The AND-gate A223 gives consequently an output signal when the AND-gate A219 or A220 gives an output signal if simultaneously a binary one is found in the eighth bit position of the PCM-word in the buffer register connected at the moment for read out and thus a group of five data bits has been read out. The output signal is brought as a control signal to the previously mentioned flip-flop V21 and the read out is switched between the buffer registers 21A and 21B. If, on the contrary, the eighth bit position in the PCM-word contains a binary zero, the read out continues until the flip-flop V21 obtains a control signal from the AND-gate A221 or A222, indicating that a group of seven data bits has been read out.

As it is mentioned earlier, the principle of the invention assumes that the relation between the data bit frequency and the frequency of the time slot selected for the data transmission, or a submultiple of the same, nominally constitutes an integer. The principle of the invention however presupposes furthermore that the relation between the PCM-bit frequency and the data bit frequency, or a submultiple of the same, likewise nominally constitutes an integer, It is assumed for example that the PCM-bit frequency is $2,048 \times 10^6$ bits/s and that the data bit frequency is $48 \times 10^3$ bits/s, the relation between the same being equal to 128/3. A phase comparison of the respective frequencies then occurs at the transmitter terminal 1 in such a way that the phase of the submultiple 3 of the data bit frequency is compared with the phase of the submultiple 128 of the PCM-bit frequency provided that the control information bits generated by the comparator K and transmitted in the sixth and seventh positions of the PCM-word both consist of binary zeros indicating synchronism. If, on the contrary, the control information bit in the sixth and the seventh bit position respectively in the transmitted PCM-word consists of a binary one, the phase comparison at the transmitter terminal 1 utilizes the submultiple 127 and the submultiple 129 respectively of the PCM-bit frequency corresponding to the conditions leading and lagging respectively.

Bit timing pulses corresponding to the data bit frequency at the transmitter terminal 1 are generated in the generator circuit 21C at the receiver terminal 2. The input *u* is fed with the PCM-bit timing pulses to produce the submultiple 128/3 (42 2/3) when the control information bits in the flip-flop registers V22 and V23 both are binary zeros, the submultiple 129/3 (43) when the control information bit in the flip-flop register V23 is a binary one and the submultiple 127 (42 1/3) when instead the control information bit in the flip-flop register V22 is a binary one. On the output *v* pulses are delivered the bit timing rate of which corresponds to said respective submultiples. According to the embodiment of the invention shown in FIG. 5 said submultiples are produced as average values of the submultiples 42 and 43 in a cycle having three consecutive bit timing pulse periods.

The generator circuit 21C comprises a frequency divider FD for the generation of the submultiple 42 and an AND-gate A224 for generating the submultiple 43 by means of an inhibition of the 43rd pulse to the frequency divider FD. Furthermore there is included a binary counter B2 connected in cascade with the frequency divider FD in order to make it possible to generate in dependence on the control information bits in the flip-flop registers V22 and V23, said cycle having three consecutive bit timing pulses, the particular bit timing pulses being formed either by the submultiple 42 or by the submultiple 43. The frequency divider B2 is provided with three outputs $\tau$1, $\tau$2 and $\tau$3 which are activated sequentially and each of which determines a respective bit timing pulse period in said cycle.

Figure 6:
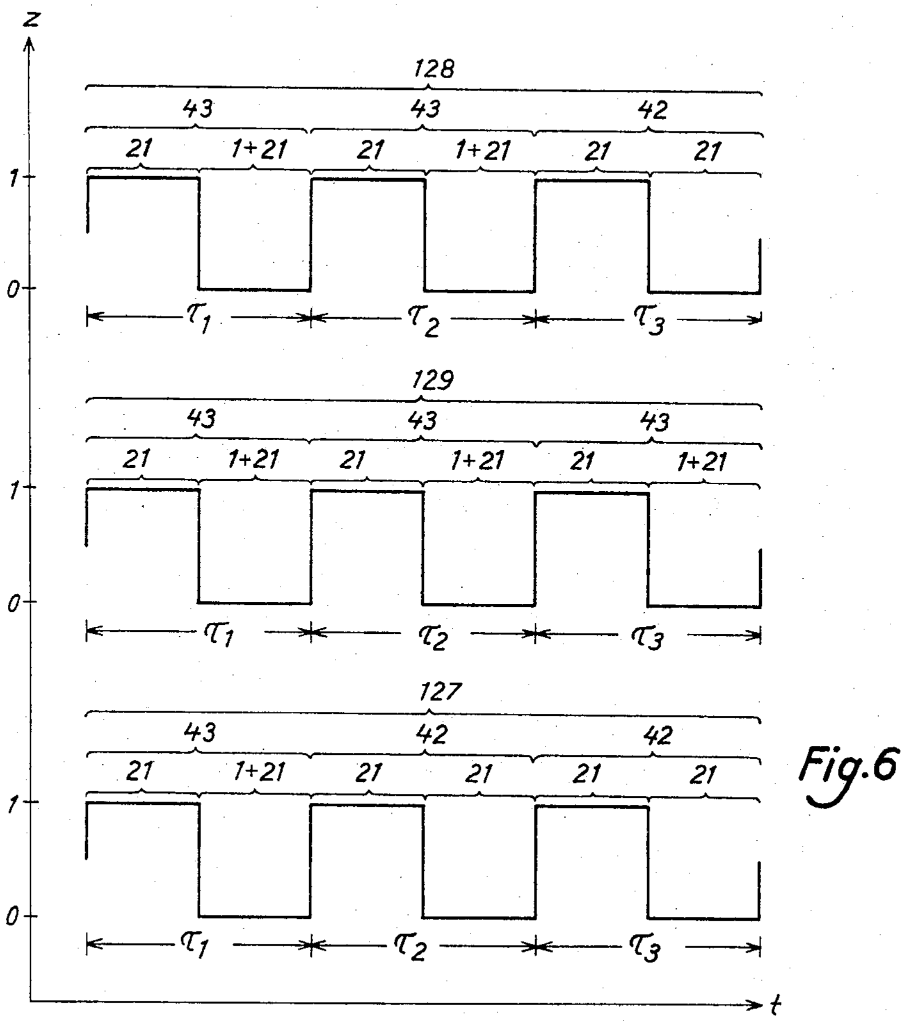

FIG. 6 contains a table and a time diagram which show how the desired submultiples are produced as average values of the submultiples 42 and 43 in a cycle of three bit timing pulses in sequence. It appears that when the flip-flop registers V22 and V23 both contain binary zeros which condition previously has been assumed to indicate synchronism between the data flow and the PCM-flow, the first bit timing pulse in the cycle is formed from the submultiple 43, the second bit timing pulse likewise from the submultiple 43 and the third and last bit timing pulse from the submultiple 42, in consequence of which the average value 128/3 (42 2/3) is obtained. It appears furthermore that by means of the AND-gate A224 the average value can be changed to 129/3 (43) or 127/3 (421/3).

The function of the generator circuit 21C will now be more fully explained with reference to the FIGS. 5 and 6. It is assumed that both flip-flop registers V22 and V23 contain binary zeros and that the output $z$ of the frequency divider FD and the output $\tau 1$ of the binary counter B2 both have just been activated. To the output $z$ is connected an inverting input of an AND-gate A225 the output of which is connected to an input of an AND-gate A226 which via an inverting output controls the previously mentioned AND-gate A224. The AND-gate A224 is by this prevented from blocking the input to the frequency divider FD as long as the output $z$ of the latter is activated which is the case during a sequence of 21 PCM-bit timing pulses from the input $u$ .

A flip-flop register V24 is connected to the AND-gate A225 and is provided with a clock input to which the PCM-bit timing pulses from the input $u$ are fed in order to register in the flip-flop register V24 the binary value on the output of the AND-gate A225 by means of the trailing edges of the pulses. The AND-gate A225 has two inputs, said inverting input connected to the output $z$ of the frequency divider FD and a second input connected to the output of an OR-circuit E21 in which a first input is connected to said output $\tau 1$ of the binary counter B2. As long as the output $z$ is activated, there is registered in the flip-flop register V24 the binary value zero from the output of the AND-gate A225.

When the output $z$ of the frequency divider FD is set to zero after the appearance of 21 PCM-pulses, the AND-gate A225 is activated which causes that the next PCM-pulse will not be registered in the frequency divider FD due to the fact that the latest registered value in the flip-flop register V24 is zero and that the output of the AND-gate A225 now has the binary value "one", the inverting output of the AND-gate A226 blocking the AND-gate A224. By means of the trailing edge of the not registered PCM-pulse there is however registered in the flip-flop register V24 the binary value "one" on the output of the AND-gate A225 which implies that the AND-gate A224 again opens for the PCM-pulses during a sequence of 21 incoming pulses. Then the output $z$ is again set to one, the output $\tau 2$ of the binary counter being activated. The period of the first bit timing pulse in the cycle having three bit timing pulse periods is by this terminated after totally 43 PCM-pulses.

The procedure during the period of the second bit timing pulse becomes identical with what is described above. The output of an AND-gate A227 is connected to a second input of said OR-gate E21 and is activated in dependence on the fact that the output $\tau 2$ of the binary counter B2 is activated and that, as it has been assumed here, the flip-flop registers V23 and V24 contain binary zeros. Thus the period of the second bit timing pulse is terminated after totally 43 PCM-pulses, the output $z$ being set to one and the output $\tau 3$ of the binary counter B2 being activated.

The procedure during the period of the third bit timing pulse is somewhat different. The OR-gate E21 can be activated during this period via a third input of the same only if the flip-flop register V23 contains a binary one which not has been assumed to be the case. The AND-gate A225 will for this reason not be activated when the output $z$ of the frequency divider FD is set to zero after 21 PCM-pulses which implies that the blocking of the AND-gate A224 does not occur and for this reason the period of the third clock pulse is terminated after totally 42 PCM-pulses. Again the output $z$ of the frequency divider FD is set to one and the output $\tau 1$ of the binary counter B2 is activated, the flip-flop registers V23 and V24 being set to zero from the output $\tau 3$ of the binary counter B2 by means of the respective reset inputs and with the aid of the trailing edge of a pulse appearing during the activation time of the output $\tau 3$.

The function of the generator circuit 21C when the flip-flop register V22 and V23 respectively contains a binary one and then forms cycles of three bit timing pulses comprising totally 127 and 129 PCM-pulses respectively can be explained in the same way as above with the help of the FIGS. 5 and 6. It should be observed particularly that after each cycle the flip-flop registers V22 and V23, as it has been described above, are reset which implies that if the binary control information bits both constitute binary zeros one and the same cycle of the 128 PCM-pulses is repeated until another control information is obtained while if either control information bit constitutes a binary one, the cycle of 127 or 129 PCM-pulses determined by this is passed through only once, after which the cycle of 128 PCM-pulses is obtained until a control information bit with the binary value one is again registered in one of the flip-flop registers V22 and V23. The control of the frequency division will hereby occur at the receiver terminal 2 with the same time intervals at the transmitter terminal 1.

The invention is not limited to the described and shown embodiments but different embodiments and modifications are conceivable within the scope of the invention. For example, the short and long data bit groups alternating with each other, which according to the example above are contained individually in a PCM-word of eight bits, can instead be contained in two PCM-words in sequence. This can be motivated in the case that the eight bit position in the PCM-word is not available but is used for synchronism. If still on an average six data bits are to be sent per PCM-word this is achieved by forming data bit groups consisting of 11 and 13 bits respectively and alternating with each other. Two PCM-words contain totally 16 bits, 14 of which are assumed to be at disposal. A bit must be reserved for mutual identification of the data bit groups and consequently, as previously was the case, two bits are obtained in a short bit group for the transmission of control information. A consequence of increasing the number of bits in the data bit groups will however be that a larger capacity is required for the buffer registers and that the precision in the regeneration is lowered since the time distance between two consecutive transmissions of the control information is increased.

We claim:

1. Method for transmitting a data flow by means of a PCM-flow, the bits of the data flow being transmitted from a transmitter terminal to a receiver terminal and being timed to the bits of the PCM-flow during a selected time slot, c h a r a c t e r i z e d in that at the transmitter terminal the data flow is divided into short and long groups of bits respectively, the respective number of bits of which is equal to a nominal number of bits ( e.g.6) appearing in the data flow within a definite number of periods ( for example 1) for the selected time slot, reduced and increased respectively by one ( 5 and 7 respectively), and the respective number of bits of which is indicated by the value of at least one identification bit (R) which is joined to each one of said bit groups in order to be transmitted together with them to the receiver terminal by means of at least one PCM-word during the selected time slot, upon synchronism between the data flow and the PCM-flow a regular pattern of said groups of bits being formed in such a way that a bit group of the short type appears alternately with a bit group of the long type, upon lagging in the data flow in relation to the PCM-flow said regular pattern being modified in such a way that at times two bit groups of the short type appear in sequence after each other, after which said regular pattern continues, and upon leading in the data flow in relation to the PCM-flow said regular pattern being modified in such a way that at times two bit groups of the long type appear in sequence after each other, after which said regular pattern continues, and the phase of a frequency corresponding to a selected submultiple ( for example 3) of the bit frequency of the data flow being compared with the phase of a frequency corresponding to a variable submultiple of the bit frequency of the PCM-flow and in dependence on the phase comparison control information bits (P,Q) being generated which on one hand are joined to said bit groups of the short type in order to be transmitted together with these to the receiver terminal by means of said PCM-word during said selected time slot and which on the other hand control the division of the bit frequency of the PCM-flow in such a way that upon conformity between the phases it is achieved that the period length of said variable PCM-submultiple frequency becomes equal to the period length ( e.g. 128 PCM-bits) of said selected data submultiple frequency, that upon lagging in the phase of the selected data submultiple frequency it is achieved that the period length of the variable PCM-submultiple frequency is increased ( 129 PCM-bits), and that upon leading of the phase of the selected data submultiple frequency it is achieved that the period length of the variable PCM-submultiple frequency is decreased (127 PCM-bits), and at the receiver terminal the PCM-words received during the selected time slot are stored, upon which the identification bit is read out in order to determine whether the associated bit group is of the short type or of the long type and if the bit group is of the short type, the control information bits transmitted together with the bit group are read out in order to generate bit timing pulses timed to the bits in the data flow at the transmitter terminal, a number (3) of said bit timing pulses, equal to said selected submultiple of the bit frequency in the data flow at the transmitter terminal forming a period length which is equal to that period length of the variable PCM-submultiple frequency which at the transmitter terminal has been produced by the control information bits ( 128 ± 1 PCM-bits) which bit timing pulses are generated thereby that the bit frequency of the PCM-flow is divided and that the control information bits control the division in such a way that the number of PCM-bits constituting the intermediate space between said bit timing pulses is varied in order to produce said equality between the period length formed by said number of said bit timing pulses and said period length for the variable PCM-submultiple frequency, and the data flow at the transmitter terminal being regenerated by reading out the respective bits of the bit groups identified as being of the short and long type respectively, in a series form and timed to said bit timing pulses.

2. Apparatus for carrying out the method according to claim 1, c h a r a c t e r i z e d in that the transmitter terminal comprises at least two buffer memories (11A,11B) arranged to be connected alternately to a data input (*a*) for registering said data flow, and to a PCM-output (*c*) for reading out the contents of the buffer memories by means of at least one PCM-word during the selected time slot, a logic circuit (L1) which controls the connection of the buffer memories to the data input in order to produce that the data flow upon the registering is divided into said short and long groups of bits, which logic circuit on one hand obtains a control signal timed to said time slot and on the other hand in the respective buffer memories is connected to an indicating output of a lower limit cell (*nr* 5), the position of which in the buffer memory corresponds to a definite number of registered bits obtained from the data input, equal to said nominal number of bits decreased by one, to an indicating output of an upper limit cell (*nr* 7) the position of which in the buffer memory corresponds to said definite number of registered bits obtained from the data input, increased by two, and to an indicating output in a cell (*nr* 6) located between said lower and upper limit cells, the position of which cell in the buffer memory corresponds to said definite number of registered bits obtained from the data input, increased by one, which indicating outputs give information whether the registering has occurred or not in the respective limit cells, the logic circuit being so designed that when upon the appearance of said control signal the indicating outputs of the buffer register connected at the moment to the data input indicate that registering has occurred in said lower limit cell but not in said cell located between the lower and the upper limit cells, a first binary signal is generated which interrupts the connection of the buffer register to the data input and which in the same buffer register in a last cell (*nr* 8) connected to the logic circuit, the position of which cell corresponds to said definite number of registered bits obtained from the data input, increased by three, registers said identification bit having a value indicating that a bit group of said short type has been registered in the buffer register, while when upon the appearance of said control signal the indicating outputs of the buffer register connected at the moment to the data input indicate that registering has occurred in said cell located between the lower and the upper limit cells, a second binary signal is generated which delays said interruption of the connection of the buffer register to the data input until registering has occurred also in said upper limit cell and which in the same buffer register registers said identification bit having a value indicating that a bit group of said long type has been registered in the buffer register, a variable frequency divider (VFD) which obtains a pulse train timed to the bit frequency of the PCM-flow and by frequency division forms said variable PCM-submultiple frequency and which has at least one control input in order to maintain, increase or decrease the actual period length of the PCM-submultiple frequency in dependence on a control signal, a phase comparator (K) to the one input of which is fed a second pulse train timed to the bit frequency of the data flow and to the second input of which said variable PCM-submultiple frequency is fed and which in dependence on the phase comparison between said submultiple frequency of the bit frequency of the data flow and the PCM-submultiple frequency generates on its output said control information bits which on one hand are fed to said control input of the frequency divider and on the other hand in dependence on said first binary signal are fed to that buffer register into which a bit group of said short type just has been written and which are registered in said intermediate cell and in said upper cell respectively of the same buffer register, and that the receiver terminal comprises at least two buffer registers (21A,21B) adapted to be connected alternately to a PCM-input (*f*) for registering of said PCM-word during the selected time slot and to a data input (*w*) for reading out of the bits of the transmitted short and long groups of bits in a series form and timed to locally generated bit timing pulses, a logic circuit (L2) which controls the connection of the buffer memories to the data output in order to produce that the groups of bits upon the reading out are linked together in a sequence that regenerates the data flow at the transmitter terminal, which logic circuit is in the respective buffer memories connected on one hand to a last cell (*nr* 8) which obtains the identification bit associated with each group of bits and on the other hand to an indicating output of a lower limit cell ( *nr* 5) the position of which in the buffer register corresponds to a definite number of bits read out to the data output, equal to said nominal number of bits decreased by one, and to an indicating output in an upper limit cell (*nr* 7), the position of which in the buffer register corresponds to said definite number of bits read out to the data output, increased by two, which indicating outputs give information whether reading out has occurred or not from the respective limit cells, the logic circuit being so designed, that if said identification bit indicates a short bit group a first binary signal is generated when the indicating outputs of the buffer register connected at the moment to the data output indicate that reading out from said lower limit cell has occurred which signal interrupts the connection of the buffer register to the data output and in the same buffer register causes that said control information bits joined to the short bit groups are read out from their respective memory positions obtained upon the registering during said time slot in said upper limit cell and in a cell (*nr* 6) located between said lower and upper limit cells, the position of which cell in the buffer register corresponds to said definite number of bits read out to the data output, increased by one, while if said identification bit indicates a long bit group a second binary signal is generated when the indicating outputs of the buffer register connected at the moment to the data output indicate that reading out from said upper limit cell has occurred which signal then interrupts the connection of the buffer register to the data output, a frequency divider (FD) which obtains a pulse train timed to the bit frequency of the PCM-flow and by frequency division generates said bit timing pulses, a binary counter (B2) which is fed with the bit timing pulses and which has a number of outputs corresponding to said selected submultiple of the bit frequency of the data flow which outputs in a cyclical sequence are activated during respective periods of consecutive periods of the bit timing pulses, a blocking means (A224) which in dependence on, on one hand the condition of the binary counter on said outputs and on the other hand on the read-out control information bits inhibits predetermined pulses in the pulse train fed to the frequency divider in order to vary the intermediate space of the bit timing pulses, so that said cyclical sequence obtains a period length equal to that period length of the variable PCM-submultiple frequency that at the transmitter terminal has been generated by the same control information bits, in consequence of which it is achieved that upon the reading out of the bits of the transmitted groups of bits the bit timing pulses have the same bit rate as had the data flow at the transmitter terminal when the groups of bits were formed.

* * * * *